United States Patent [19]

Sato et al.

[11] Patent Number: 5,034,832
[45] Date of Patent: Jul. 23, 1991

[54] ADAPTOR FOR A SMALL-SIZED TAPE CASSETTE

[75] Inventors: Seizi Sato, Kanagawa; Eiji Yano, Tokyo, both of Japan

[73] Assignee: Sony Corporation, Tokyo, Japan

[21] Appl. No.: 436,186

[22] Filed: Nov. 13, 1989

[30] Foreign Application Priority Data

Nov. 25, 1988 [JP] Japan .................................. 63-297838

[51] Int. Cl.⁵ ............................................. G11B 5/008
[52] U.S. Cl. ...................................... 360/94; 360/96.5
[58] Field of Search ........................... 360/94, 93, 96.5

[56] References Cited

U.S. PATENT DOCUMENTS 4,477,850 10/1984 Ogata et al. ........................... 360/94
4,554,603 11/1985 Tsuchiya ............................... 360/94
4,602,300 7/1986 Ogata et al. ........................... 360/94
4,622,605 11/1986 Tsuruoka et al. ..................... 360/94

Primary Examiner—A. J. Heinz
Assistant Examiner—Jefferson Evans
Attorney, Agent, or Firm—Philip M. Shaw, Jr.

[57] ABSTRACT

An adaptor having the same size as that of a standardized tape cassette accommodates a small-sized tape cassette for insertion into a recording and/or reproducing apparatus and includes an upper adaptor half formed to become openable and/or closable, a pair of tape withdrawing levers for withdrawing a magnetic tape from the small-sized tape cassette, and a pair of coupling members for coupling the upper adaptor half to the tape withdrawing levers, wherein when the upper adaptor half is rotated in its closing direction, the tape withdrawing levers are rotated to withdraw the magnetic tape so that the magnetic tape is extended within the adaptor.

3 Claims, 5 Drawing Sheets

1

ADAPTOR FOR A SMALL-SIZED TAPE CASSETTE

BACKGROUND OF THE INVENTION

1. Field of the Invention

The present invention relates generally to adaptors for a tape cassette and, more particularly, is directed to an adaptor for a small-sized tape cassette by which the small-sized tape cassette is made compatible with a standardized tape cassette by loading it into an adaptor

2. Description of the Prior Art

Video tape recorders (VTR) are used with loadable tape cassettes. The cassette's magnetic tape is withdrawn from the tape cassette housing and is wrapped around a head drum, whereby the magnetic tape is recorded and/or reproduced by a magnetic head mounted on the head drum. Accordingly, a VTR is restricted by the size of the tape cassette That is, a VTR configured for a standardized tape cassette cannot be used with a different sized tape cassette A video apparatus, such as a video camera, utilizes a small-sized tape cassette because the user wants a smaller-sized video camera. For playing back a small-sized tape cassette, an adaptor is used so that the small-sized tape cassette functions as a standard tape cassette. Such an adaptor is disclosed, for example, in Japanese Laid-Open Patent Gazette No. 58-185072.

Thus, when one uses a video camera, a small-sized tape cassette is loaded into the video camera To play the small-sized tape used in a video camera on standardized equipment, the tape is placed within an adaptor which is the same size as a standardized tape cassette. Afterwards, the adaptor is loaded into the VTR. Thus, the small-sized tape cassette and the standardized tape cassette player are made compatible with each other. This allows for expanded applications of small-sized tape cassettes.

Prior art adaptors are motor-driven such that a motor loads the magnetic tape from the small-sized tape cassette into the adaptor The motor results in increased manufacturing cost Further, the motor and battery for driving the motor increase the weight of the adaptor Moreover, once the battery is exhausted, the motor does not work and the adaptor becomes useless Furthermore, the relatively large motor and battery make it difficult to form a small apparatus. In addition, since the rotations of the motor are transmitted to a driving mechanism, the adaptor cannot operate at high speeds.

OBJECTS AND SUMMARY OF THE INVENTION

Accordingly, it is an object of the present invention to provide an improved adaptor for a small-sized tape cassette which can eliminate the defects encountered with the prior art.

More specifically, it is another object of the present invention to provide an adaptor for a small-sized tape cassette in which a motor and a battery are removed Another object of the present invention is to provide a lightweight and inexpensive adaptor for a small-sized tape cassette Still another object of the present invention is to provide an adaptor for a small-sized tape cassette which can be operated at any plate and which can be miniaturized with reduced restrictions.

Yet another object of the present invention is to provide an adaptor for a small-sized tape cassette in which the small-sized tape cassette is readily loaded into and/or unloaded from the adaptor Thus, in accordance with the present invention, there is provided a tape cassette adaptor in which a tape cassette, smaller than a standardized tape cassette, is accommodated in the adaptor which is the same size as a standardized tape cassette Thus, the small-sized tape cassette is loaded into and/or unloaded from a recording and/or reproducing apparatus utilizing the standardized tape cassette The adaptor includes an upper adaptor half portion formed so as to become openable and/or closable; a pair of tape withdrawing levers for withdrawing a magnetic tape from the small-sized tape cassette; and coupling members for coupling the upper adaptor half portion to the tape withdrawing levers, wherein when the upper adaptor half portion is rotated in its closing direction, the tape withdrawing levers are rotated to withdraw the magnetic tape so that the magnetic tape is extended within the adaptor These and other objects, features and advantages of the present invention, will be apparent in the following detailed description of a preferred embodiment when read in conjunction with the accompanying drawings, in which like reference numerals are used to identify the same or similar parts in the several views

DETAILED DESCRIPTION OF A PREFERRED EMBODIMENT

The present invention will now be described in detail with reference to the drawings.

Figure 1:
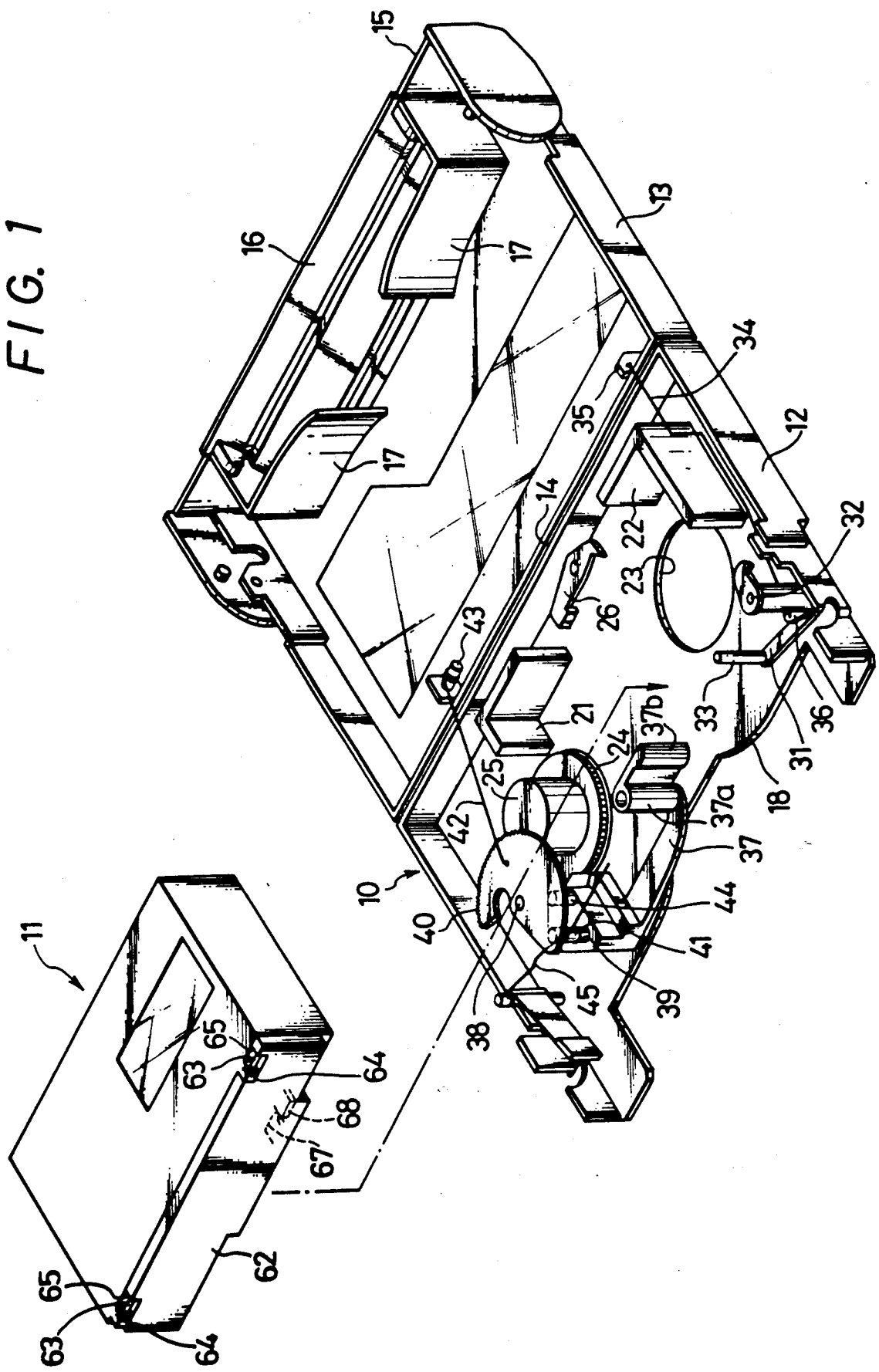
FIG. 1 is a perspective exploded view illustrating an adaptor for a small-sized tape cassette according to an embodiment of the present invention, to which reference will be made in explaining how to load the small-sized tape cassette into the adaptor.

In FIG. 1, reference numeral 10 generally designates an adaptor according to an embodiment of the present invention. The adaptor 10 accommodates a small-sized tape cassette 11 which is smaller than a standardized tape cassette. The adaptor 10 is arranged so that it can be loaded into and/or unloaded from a recording and- /or reproducing apparatus (not shown) which utilizes a standardized tape cassette.

Figure 6:
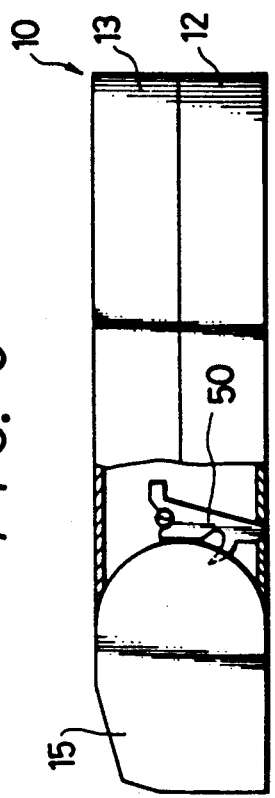
FIG. 6 is a side view, with portions broken away and in section, illustrating a lock mechanism which locks the front lid of the adaptor.

The adaptor 10 is comprised of a lower adaptor half portion 12 and an upper adaptor half portion 13, each being made of a synthetic resin material by a molding-process. These lower and upper adaptor half portions 12 and 13 are rotatably coupled along one set of longitudinal edges by a flexible hinge portion 14 so that they can be rotated between an open position, as shown in FIG. 1, for receiving the small sized tape cassette 11 and a closed position, as shown in FIG. 6, for containing the small sized tape cassette. A front lid 15 is rotatably mounted to the top portion of the upper adaptor half portion 13, and an auxiliary lid 16 is mounted to the inside of the front lid 15. A guide wall 17 is elongated from the inside of the auxiliary lid 16. A bottom opening 18 is formed through the front wall of the lower adaptor half portion 12 in association with the guide wall 17, whereby the guide wall 17 is configured to come in contact with the edge portion of the opening 18.

On its lower adaptor half portion 12, the adaptor includes a pair of "L" shaped cassette guides 21 and 22 which are used to determine the position at which the small-sized tape cassette 11 is loaded into the adaptor 10. A circular opening 23 is formed through the lower adaptor half portion 12 of the adaptor 10. One reel shaft of a recording and/or reproducing apparatus (not shown) is inserted into the circular opening 23. The other reel shaft (not shown) of the recording and/or reproducing apparatus is received by a concave portion formed on a lower surface of a boss 25 of a drive gear 24 which is provided in an opposing relation to the opening of the lower adaptor half portion 12.

Figure 2:
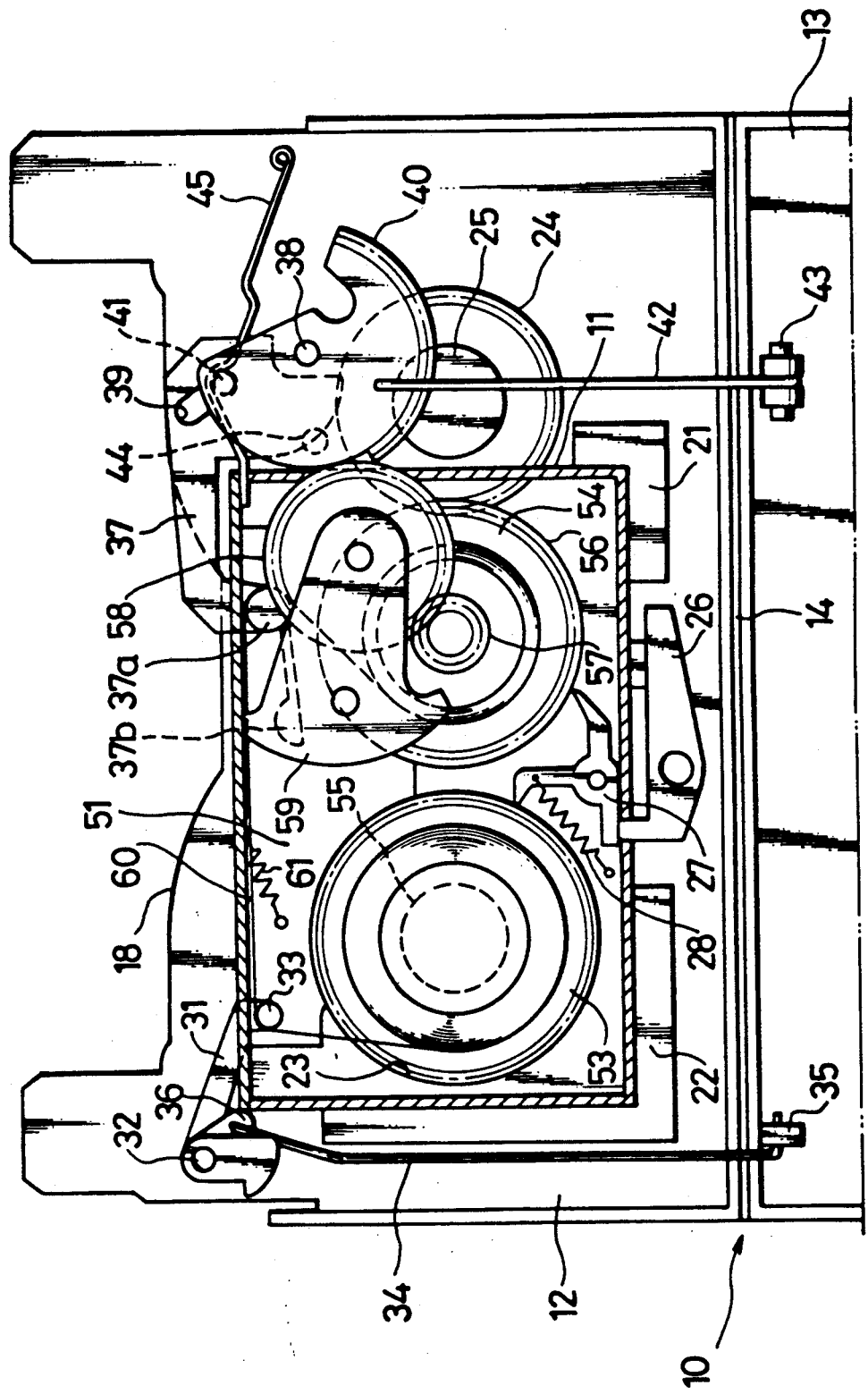
FIG. 2 is a horizontal sectional view of the adaptor in which the small-sized tape cassette is accommodated.

A release lever 26 is mounted to the rear side portion of the lower adaptor half portion 12 of the adaptor 10 at the position at which the small-sized tape cassette 11 is loaded. As shown in FIG. 2, when the small-sized tape cassette 11 is loaded into the adaptor 10, the release lever 26 rotates a reel lock lever 27 provided within the small-sized tape cassette 11 against a spring force of a spring 28, thereby releasing a reel brake (not shown) of the small-sized tape cassette 11 (see FIG. 4)

As shown in FIG. 1, a supply-tape side withdrawing arm 31 is rotatably supported at one side of the lower adaptor half portion 12 of the adaptor 10 by a support pin 32. A tape guide 33 is implanted on a top of the arm 31, and the arm 31 is coupled to a protruding portion 35 of the upper adaptor half portion 13 by a wire 34. Further, the arm 31 is provided with a pushing portion 36 to push a front lid 62 of the small-sized tape cassette 11 in the lateral direction, as will be explained later.

A take-up side tape withdrawing arm 37 is provided on the lower adaptor half portion 12 of the adaptor 10 at the position opposite to the arm 31. The arm 37 is provided with an L-shaped tape bearing member having tape bearing surfaces 37a and 37b. This arm 37 is rotatably supported on the lower adaptor half portion 12 by a support pin 38, and the arm 37 has formed therethrough an oval opening 39 to receive a pin 41 implanted on the lower surface of a segment gear 40. The arm 37 is coupled to a pin 43 provided on the sidewall of the upper adaptor half portion 13 by a connection wire 42. Further, another pin 44 is implanted on the lower surface of the segment gear 40, and a lever spring 45 is pushed by the pin 44.

A mechanism for controlling a rotating attitude of the front lid 15 of the adaptor 10 and a locking mechanism for locking the front lid 15 will be explained hereinbelow.

Figure 5:
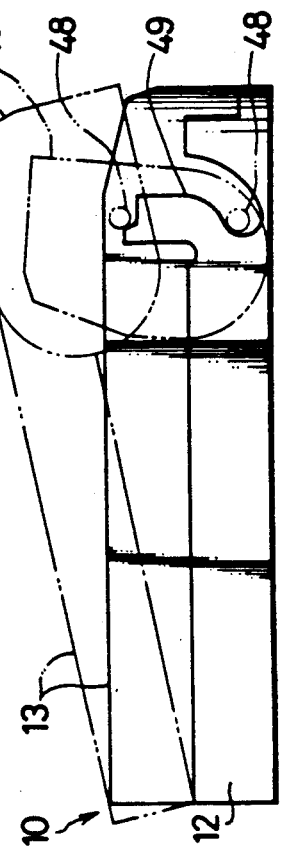
FIG. 5 is a side view of the adaptor, to which reference will be made in explaining how to close the upper adaptor half portion of the adaptor.

As shown in FIG. 5, a pin 43 is integrally formed with the side wall of the front lid 15, and this pin 48 is guided by a guide wall 49 of the lower adaptor half portion 12, by which the attitude of the front lid 15 in its closing movement is controlled so as to form a clearance between the front lid 15 and the auxiliary lid 16. When the front lid 15 is in its closed state, it is locked in its closed state by a lock lever 50 as shown in FIG. 6.

Figure 4:
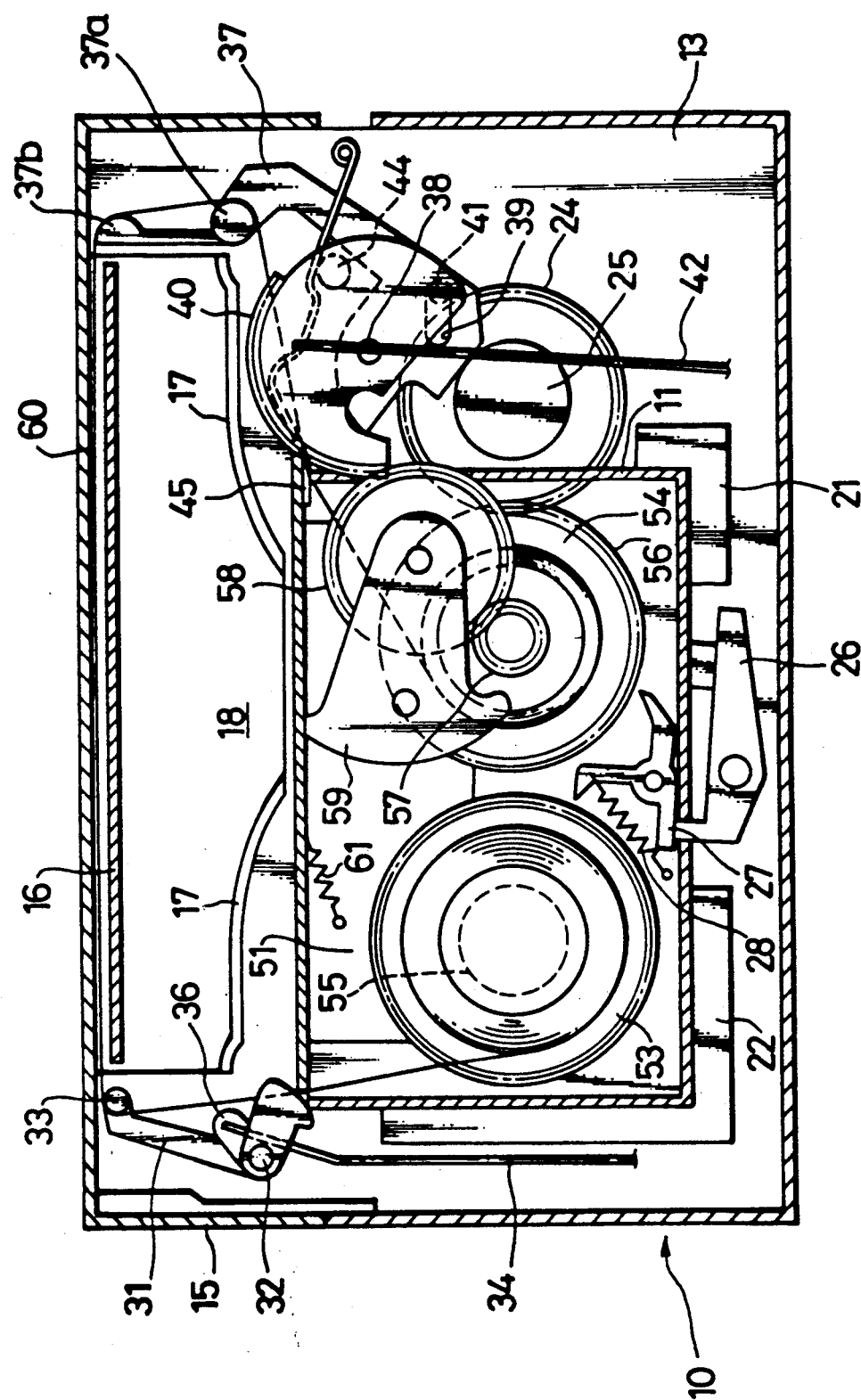
FIG. 4 is a horizontal sectional view of the main components of the adaptor, to which reference will be made in explaining the condition that a magnetic tape withdrawn from the small-sized tape cassette is extended inside of the adaptor.

The inside arrangement of the small-sized tape cassette 11 will be explained next. Turning to FIGS. 2 and 4, a pair of left and right reel hubs 53 and 54 are provided within the small-sized tape cassette 11. The lower surface of a boss 55 of the reel hub 53 receives the reel shaft (not shown) of the recording and/or reproducing apparatus. The pair of reel shafts of the recording and/or reproducing apparatus are respectively received by the boss 55 of the reel hub 53 and the boss 25 of the driving gear 24 of the adaptor 10. The other reel hub 54 has a gear 56 formed around its outer peripheral portion. Further, the reel hub 54 is provided with a small gear 57 at its top portion and this small gear 57 meshes with a pendulum-type gear 58. The pendulum-type gear 58 is rotatably supported by a lever 59, and the lever 59 is rotatably supported on the inside surface of the upper wall of the small-sized tape cassette 11. A magnetic tape 60 is wound around the pair of reel hubs 53 and 54.

Figure 7:
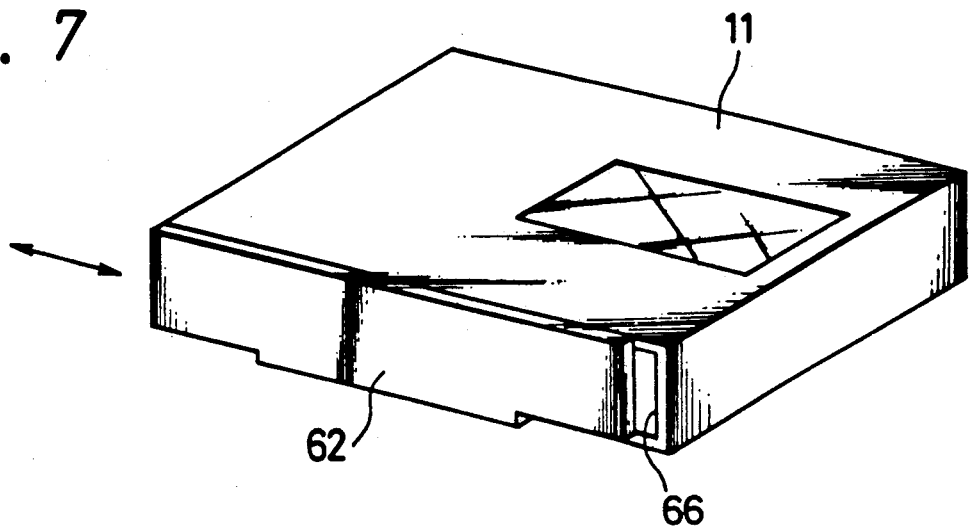
FIG. 7 is a perspective view, with portions broken away and in section, of a small-sized tape cassette used to explain the advantage of the present invention.
Figure 8:
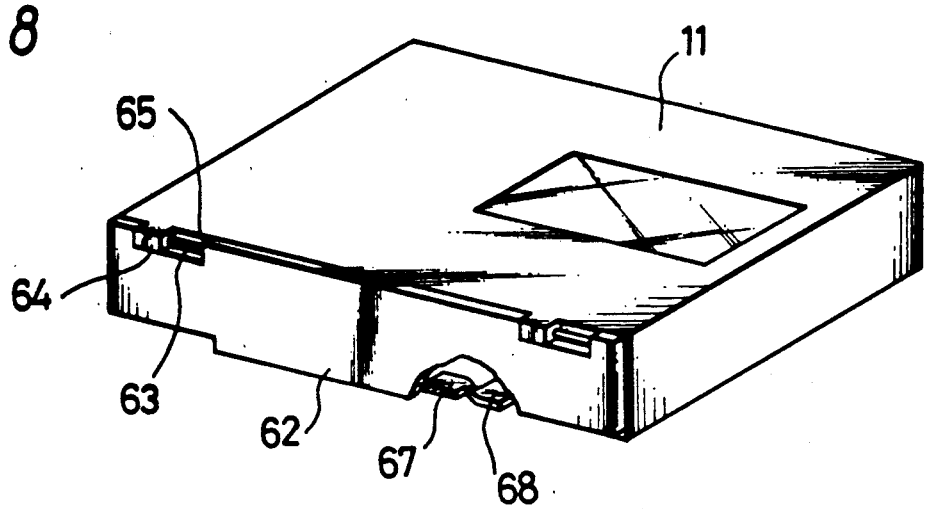
FIG. 8 is a perspective view of a small-sized tape cassette with its front lid closed.
Figure 9:
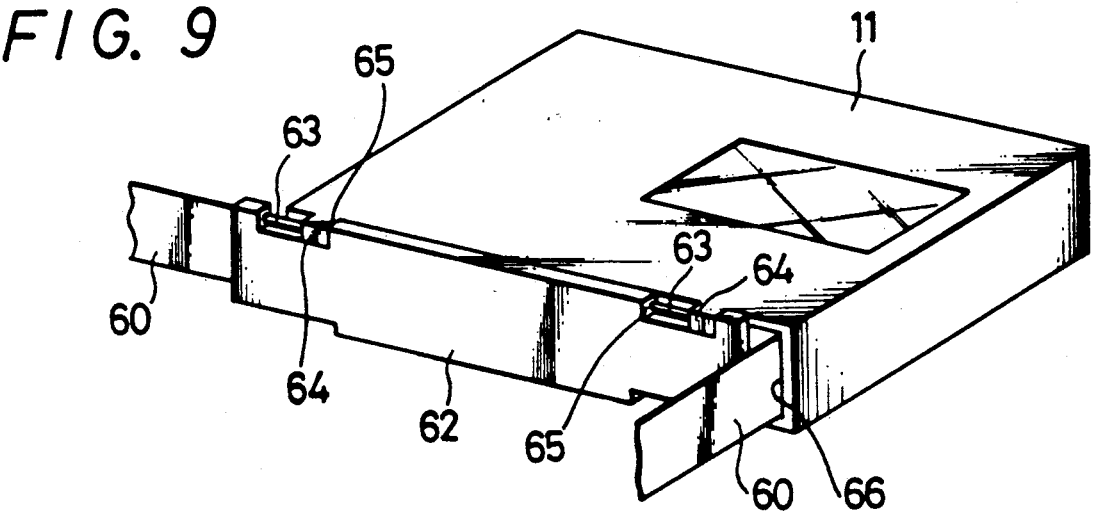
FIG. 9 is a perspective view of a small-sized tape cassette in which the front lid is slidably moved in the lateral direction.

The front opening of the small-sized tape cassette 11 is opened and/or closed by an openable and closable front lid 62 as shown in FIG. 8. The front lid 62 is hinged on the housing of the small-sized tape cassette 11 by a hinge pin 63. A coil spring 61 attached between the back-surface of the lid 62 and the inner surface of the small-sized cassette resiliently biases the lid 62 to be both laterally and rotatingly closed; This coil spring 61 is located above the path of the tape 60. An engaging portion 64, provided on the housing of the tape cassette 11 to support the pin 63, is engaged into a cut-away portion 65 of the front lid 62, whereby the front lid 62 is also allowed to move in the lateral direction, i.e. in the direction of the arrow in FIG. 7. When the front lid 62 is closed after the magnetic tape 60 has been withdrawn, a slit-shaped opening 66 is formed by the moved front lid 62 and one side wall of the housing of the small-sized tape cassette 11 as shown in FIG. 9.

As shown in FIG. 8, the front lid 62 is also provided with a locking member 67 which engages with a corresponding locking member 68 on the housing side of the tape cassette 11. Thus, the front lid 62 can be locked in its closed state.

Figure 3:
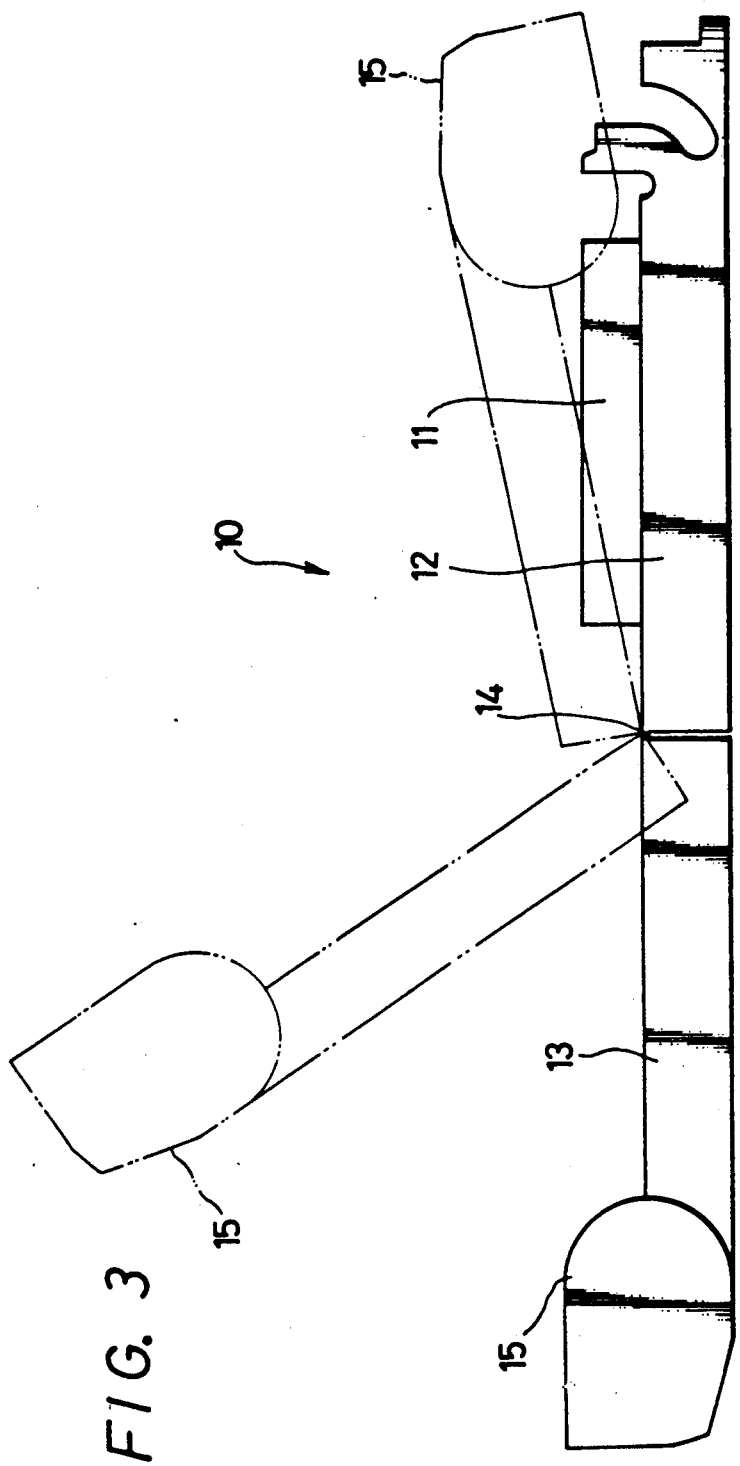
FIG. 3 is a side view of FIG. 2, to which reference will be made in explaining the rotating operation of the upper adaptor half portion of the adaptor.

As shown in FIGS. 1 to 3, to open the adaptor 10 in order to load a small sized tape cassette 11, the upper adaptor half 13 of the adaptor 10 is rotated around the hinge 14. In this state, as shown in FIG. 2, the small-sized tape cassette 11 is placed onto the lower adaptor half 12 of the adaptor 10. An opening 51 in the bottom of the small-sized cassette just behind the lid 62 allows the pair of tape withdrawing arms 31 and 37 on the lower portion 12 of the adaptor 10 to enter behind the magnetic tape 60 which is extended along the inside of the front lid 62 of the small-sized tape cassette 11. When the small-sized tape cassette 11 is loaded into the lower adaptor half 12, the release lever 26 simultaneously pushes the reel lock lever 27 so that the reel lock lever 27 is rotated against the spring force of the spring 18, thereby releasing the pair of reel hubs 53 and 54 within the small-sized tape cassette 11.

In this state, the upper adaptor half 13 is rotated around the hinge portion 14 and then closed. As best shown in FIGS. 2 and 4, with the closing movement of the upper adaptor half 13, the coupling wire 34 rotates the supply-reel side tape withdrawing arm 31, whereby the pushing portion 36 of the arm 31 pushes the front lid 62 of the small-sized tape cassette 11 in the lateral direction, thus disengaging the lock member 67 of the front lid 62 from the locking member 68. In this manner, the front lid 62 is unlocked. Further, when the upper adaptor half 13 rotates, the driving gear 40 is rotated by the coupling wire 42. Then, the pin 44 implanted on the lower surface of the driving gear 40 pushes and rotates the lever spring 45 so that the lever spring 45 rotates open the unlocked front lid 62.

The operation for withdrawing the magnetic tape 60 from the small-sized tape cassette 11 and for extending the magnetic tape 60 within the adaptor 10 will now be described.

When the upper adaptor half 13 is closed, the coupling wire 34 rotates the supply-reel side tape withdrawing arm 31 to allow the tape guide 33 to withdraw the magnetic tape 60 provided within the small-sized tape cassette 11. The other coupling wire 42 rotates the segment gear 40 synchronously when the upper adaptor half 13 rotates in its closing direction. Then, the pin 41 provided on the segment gear 40 rotates the take-up side tape withdrawing arm 37, whereby this arm 37, via upstanding tape bearing surfaces 37a and 37b, similarly withdraws the magnetic tape 60 provided within the small-sized tape cassette 11. In this manner, as shown in FIG. 4, the magnetic tape 60 within the small-sized tape cassette 11 is extended across the bottom opening 18 of the adaptor 10.

When the take-up side tape withdrawing arm 37 is rotated to a predetermined position, the pin 44 provided on the lower surface of the driving gear 40 synchronously moves toward the circumferential direction of the driving gear 40, causing the lever spring 45 to return to the initial position. Thus, the front lid 62 of the small-sized tape cassette 11 is rotated closed but remains laterally displaced, as shown in FIG. 9. In this position, the locking member 67 is not engaged with the engaging member 68 and hence the front lid 62 is not locked. Then, the magnetic tape 60 travels through the slit 66 formed at one side of the front lid 62 and through the spacing formed on the rear side of the other end of the front lid 62.

When the upper adaptor half 13 is closed, as shown in FIG. 5, the pin 48 of the front lid 15 of the upper adaptor half 13 is guided by the front edge of the guide wall 49 of the lower adaptor half 12, whereby the upper adaptor half 13 is moved while the front lid 15 is opened. This means that a large spacing is formed between the front lid 15 and the auxiliary lid 16. Thus, the magnetic tape 60, extended through the spacing between the front lid 15 and the auxiliary lid 16, is positioned for movement.

After the small-sized tape cassette 11 is placed, or accommodated, within the adaptor 10, as set forth above, the adaptor 10 is then loaded into a recording and/or reproducing apparatus, i.e. a video tape recorder (VTR). When the adaptor 10 is loaded into the video tape recorder, the magnetic tape 60, extended along the front portion of the adaptor 10, is guided along the tape path of the video tape recorder and is brought in contact with a magnetic head mounted on a rotary head drum (not shown). Thus, the video tape recorder is ready to perform recording and/or reproduction. When the recording and/or reproduction is completed, the magnetic tape 60 is pulled into the adaptor 10 by the action of the tape drive shafts of the VTR acting through the reel hub 53 and the gear 24. The adaptor 10 is thereafter removed from the video tape recorder.

To remove the small-sized tape cassette 11 from the adaptor 10, the upper adaptor half 13 is rotated around the hinge portion 14 from a closed to an open position. When the upper adaptor half 13 is opened, the supply-side tape withdrawing arm 31 and the take-up side tape withdrawing arm 37 are both synchronously rotated from the state of FIG. 4 to the state of FIG. 2, in a manner opposite to that in which the upper adaptor half 13 is rotated into its closing direction. Further, when the upper adaptor half 13 is opened, the coupling wire 42 rotates the segment gear 40 around the pin 38 in the counter-clockwise direction. When the driving gear 40 is rotated in the counter-clockwise direction, the pendulum-type gear 58 meshes with the segment gear 40, and also, the rotation of the gear 58 is transmitted through the small gear 57 to the reel hub 54. Accordingly, the magnetic tape 60, slackened in accordance with the rotation of the arms 31 and 37, can be rewound by the reel hub 54. In this manner, the magnetic tape 60, withdrawn inside of the adaptor 10, is accommodated within the small-sized tape cassette 11.

When the supply-side tape withdrawing arm 31 is rotated, the pushing portion 36 of the arm 31 is disengaged from the front lid 62, whereby the front lid 62 is moved in the lateral direction to its closed state and its lock member 67 is engaged with the locking member 68 as shown in FIG. 8, thus the front lid 62 is closed and locked. Thereafter, it is possible to remove the small-sized tape cassette 11 from the adaptor 10.

The rotation of the adaptor's upper half 13 makes it possible to withdraw the magnetic tape 60 positioned within the small-sized tape cassette 11. Consequently, the disclosure herein provides an adaptor which does not need a motor. Furthermore, since there is no need for a motor or battery, it is possible to reduce the price and weight of the adaptor. Further, the adaptor of the present invention is free from the problems associated with a dead battery. Hence, the adaptor can be used in any place. Moreover, without the restrictions of a motor and a battery, it can be miniaturized.

If the front lid 62 of the small-sized tape cassette 11 is arranged so that it can rotate only, the front lid 62 will interfere with the arm 31 and the magnetic tape 60 when the small-sized tape cassette 11 is loaded into the adaptor 10. To avoid this interference, one side portion of the front lid 62 must be cut off, however if the front lid 62 is cut off, the magnetic tape 60 is exposed when the front lid 62 is closed.

In order to eliminate this defect, the front lid 62 is arranged to be openable and movable in the lateral direction, as shown in FIGS. 8 and 9. Thus, when the small-sized tape cassette 11 is loaded into the adaptor 10, the front lid 62 does not interfere with the arm 31 while the slit-shaped opening 66 is formed to withdraw the magnetic tape 60. As shown in FIG. 9, the magnetic tape 60 is withdrawn when positioned inside of the adaptor 10. Consequently, it becomes possible to effectively utilize the space of the magnetic tape 60 in its width direction. Thus, the size of the small-sized tape cassette 11 in its height direction can be minimized.

As set out above, according to the present invention, the upper portion 13 of the adaptor 10 is arranged to become openable and/or closable and the upper portion 13 is coupled to the tape withdrawing lever of the adaptor by the coupling member or wires 34 and 42, whereby when the upper portion 13 is rotated in its closing direction and the tape withdrawing lever is rotated to extend the magnetic tape 60 within the adaptor 10. Thus, the adaptor 10 does not need a motor or a battery, and therefore it can be light-weight and inexpensive. Further, the adaptor can be operated at any place and can be miniaturized with reduced restrictions. Furthermore, the adaptor is free from the speed of an adaptor motor. In addition, the adaptor can be readily loaded into and/or unloaded from the recording and/or reproducing apparatus.

Finally, according to the adaptor of the present invention, the front lid 62 of the small-sized tape cassette is closed when the magnetic tape is fully withdrawn within the small-sized tape cassette. Thus, the thickness of the front lid can be reduced, allowing for a more compact-sized adaptor with excellent space efficiency.

Having described a preferred embodiment of the invention in detail with reference to the accompanying drawings, it is to be understood that the invention is not limited to the precise embodiment disclosed and that many changes and modifications could be effected by one skilled in the art without departing from the spirit and scope of the invention as defined in the appended claims.

We claim as our invention:

1. An adaptor for a small-sized tape cassette of the type which is smaller than a standardized tape cassette, contains a reel wound tape and has a front lid, for the purpose of enabling the small-sized tape cassette to be loaded into and/or unloaded from a recording and/or reproducing apparatus of the type which utilizes a standardized tape cassette, the adaptor comprising:
   (a) a lower adaptor half for receiving the small sized tap cassette;
   (b) an upper adaptor half hinged to the lower adaptor half so that they can be rotated between an open position, for receiving the small sized tape cassette, and a closed position, for containing the small sized tape cassette;
   (c) a pair of tape withdrawing levers rotatably mounted on the lower adaptor half;
   (d) coupling means for coupling the upper adaptor half to the tape withdrawing levers, wherein when the upper adaptor half is rotated to the closed position, the tape withdrawing levers are rotated to withdraw the magnetic tape so that the magnetic tape is extended within the adaptor; and
   (e) front lid opening and closing means coupled to the upper adaptor half for opening the front lid of the small-sized tape cassette and wherein when the front lid is opened, the tape withdrawing levers rotate to withdraw the magnetic tape from the small-sized tape cassette.

2. An adaptor for a small-sized tape cassette according to claim 1, wherein when the magnetic tape is fully withdrawn from the small-sized tape cassette by the tape withdrawing levers and is extended within the adaptor, the front lid of the small-sized tape cassette is closed by the opening and closing means.

3. An adaptor for accommodating a small-sized tape cassette of the type which is smaller than a standardized tape cassette, for the purpose of enabling the small-sized tape cassette to be loaded into and/or unloaded from a recording and/or reproducing apparatus of the type which utilizes a standardized tape cassette, the adaptor comprising:
   (a) a lower adaptor half for receiving the small sized tap cassette;
   (b) an upper adaptor half hinged to the lower adaptor half so that they can be rotated between an open position, for receiving the small sized tape cassette, and a closed position, for containing the small sized tape cassette;
   (c) tape withdrawing means mounted on the lower adaptor half for withdrawing a magnetic tape from the small-sized tape cassette;
   (d) wherein the small-sized tape cassette has a front lid which can be rotated open and also slid laterally in the direction of the small-sized tape cassette's length; and
   (e) front lid opening and closing means coupled to the upper adaptor half for opening the front lid of the small-sized tape cassette and wherein the means for opening and closing the lid of the small-sized tape cassette slides the lid laterally and rotates the lid open to allow the tape withdrawing levers to rotate and withdraw the tape from the small-sized tape cassette and then rotates the lid closed while simultaneously maintaining the lid in its laterally displaced position to create a space between one end of the lid and the small-sized tape cassette to allow the tape to pass out of the small-sized tape cassette.

* * * * *